US010655239B2

(12) United States Patent
Sarrazin et al.

(10) Patent No.: US 10,655,239 B2
(45) Date of Patent: May 19, 2020

(54) METHOD FOR PREPARING A COMPOSITE, COMPOSITE THUS OBTAINED AND USES THEREOF

(75) Inventors: Christian Sarrazin, Verrieres le Buisson (FR); Sebastien Lagoutte, Grenoble (FR); Mathieu Pinault, Antony (FR); Francois Tran Van, Fondettes (FR); Claude Chevrot, Saint Germain en Laye (FR); Pierre Henry Aubert, Osny (FR)

(73) Assignees: COMMISSARIAT A L'ENERGIE ATOMIQUE ET AUX ENERGIES ALTERNATIVES, Paris (FR); UNIVERSITE DE TOURS, Tours (FR); CY CERGY PARIS UNIVERSITÉ, Cergy-Pontoise (FR)

( * ) Notice: Subject to any disclaimer, the term of this patent is extended or adjusted under 35 U.S.C. 154(b) by 505 days.

(21) Appl. No.: 13/808,409

(22) PCT Filed: Jul. 6, 2011

(86) PCT No.: PCT/EP2011/061438
§ 371 (c)(1),
(2), (4) Date: Mar. 19, 2013

(87) PCT Pub. No.: WO2012/004317
PCT Pub. Date: Jan. 12, 2012

(65) Prior Publication Data
US 2013/0189586 A1    Jul. 25, 2013

(30) Foreign Application Priority Data

Jul. 7, 2010  (FR) ..................... 10 55526

(51) Int. Cl.
*C25D 11/00*  (2006.01)
*H01M 4/66*  (2006.01)
(Continued)

(52) U.S. Cl.
CPC .............. *C25D 11/00* (2013.01); *B82Y 10/00* (2013.01); *B82Y 30/00* (2013.01); *C08K 3/10* (2013.01);
(Continued)

(58) Field of Classification Search
CPC ........ B82Y 10/00; B82Y 30/00; H01M 4/625; H01M 4/663; H01M 4/667; H01M 4/668;
(Continued)

(56) References Cited

U.S. PATENT DOCUMENTS 4,461,680 A * 7/1984 Lashmore .............. C25D 3/562
                                                    204/DIG. 9
5,189,770 A * 3/1993 Waidhas ................ H01G 9/025
                                                    29/25.03
(Continued)

FOREIGN PATENT DOCUMENTS

JP          200550669 A     2/2005
JP          2009507338 A    2/2009
(Continued)

OTHER PUBLICATIONS

Zhou et al ("Relationship between preparation conditions, morphology, and electrochemical properties of polyaniline prepared by pulsed galvanostatic method (PGM)". Thin Solid Films 405. p. 223-239 [Year: 2004]).*

(Continued)

*Primary Examiner* — Stephen J Yanchuk
(74) *Attorney, Agent, or Firm* — Pearne & Gordon LLP

(57) ABSTRACT

The present invention concerns a method for preparing a composite material comprising electrically conductive or semiconductive nano-objects of elongate shape and an electrically conductive polymer matrix, said method comprising a step consisting in electrochemically depositing said matrix on said nano-objects using a pulsed galvanostatic technique.

(Continued)

The present invention also concerns the composite material thus obtained and uses thereof.

17 Claims, 7 Drawing Sheets

(51) Int. Cl.
| | |
|---|---|
| C09D 5/44 | (2006.01) |
| H01G 11/30 | (2013.01) |
| C25D 13/18 | (2006.01) |
| H01G 11/22 | (2013.01) |
| C25D 13/04 | (2006.01) |
| H01G 11/24 | (2013.01) |
| C09D 5/24 | (2006.01) |
| B82Y 30/00 | (2011.01) |
| B82Y 10/00 | (2011.01) |
| C25D 13/12 | (2006.01) |
| C25D 5/54 | (2006.01) |
| H01G 11/36 | (2013.01) |
| H01G 11/48 | (2013.01) |
| C08K 3/10 | (2018.01) |
| C09D 7/40 | (2018.01) |
| C25D 9/02 | (2006.01) |
| H01M 4/62 | (2006.01) |

(52) U.S. Cl.
CPC ............... *C09D 5/24* (2013.01); *C09D 5/448* (2013.01); *C09D 7/70* (2018.01); *C25D 5/54* (2013.01); *C25D 9/02* (2013.01); *C25D 13/04* (2013.01); *C25D 13/12* (2013.01); *C25D 13/18* (2013.01); *H01G 11/22* (2013.01); *H01G 11/24* (2013.01); *H01G 11/30* (2013.01); *H01G 11/36* (2013.01); *H01G 11/48* (2013.01); *H01M 4/625* (2013.01); *H01M 4/663* (2013.01); *H01M 4/667* (2013.01); *H01M 4/668* (2013.01); *Y02E 60/13* (2013.01)

(58) Field of Classification Search
CPC ........ C09D 5/24; C09D 5/448; C09D 7/1291; C25D 5/54; C25D 13/12; C25D 13/04; C25D 13/18; C25D 11/00; C25D 9/02; H01G 11/22; H01G 11/24; H01G 11/30; H01G 11/36; C08L 81/02
See application file for complete search history.

(56) References Cited

U.S. PATENT DOCUMENTS

| | | | |
|---|---|---|---|
| 6,356,433 | B1 | 3/2002 | Shi et al. |
| 2003/0077515 | A1 | 4/2003 | Chen et al. |
| 2003/0143453 | A1* | 7/2003 | Ren .............. B82Y 10/00 429/209 |
| 2005/0042450 | A1 | 2/2005 | Sano et al. |
| 2005/0153130 | A1 | 7/2005 | Long et al. |
| 2008/0039557 | A1 | 2/2008 | Li et al. |
| 2009/0269511 | A1* | 10/2009 | Zhamu ............ B82Y 30/00 427/558 |
| 2010/0051471 | A1 | 3/2010 | Meng et al. |
| 2013/0108865 | A1 | 5/2013 | Boulanger et al. |

FOREIGN PATENT DOCUMENTS

| | | |
|---|---|---|
| JP | 2009541198 A | 11/2009 |
| WO | 03049219 A1 | 6/2003 |
| WO | 2007029934 A1 | 3/2007 |
| WO | 2008000045 A1 | 1/2008 |
| WO | 2008005431 A2 | 1/2008 |
| WO | 2008016990 A2 | 2/2008 |

OTHER PUBLICATIONS

Zhang et al ("Syntehsis of polypyrrole film by pulsed galvanostatic method and its application as supercapacitor electrode material". J Mater Sci 45:1947-19544 [Year 2010].*
He et al ("Electropolynnerization of ionic liquid substituted polyphenylene as supercapacitor materials". Electrochemistry communications 11. p. 1671-1674. [Year 2009]).*
Jiao et al ("Influence of Preparation conditions on the morphology of Polyaniline electrodeposited by the pulsed galvanostatic method". Journal of Applied Polymer Science. vol. 94. p. 1389-1394 [Year 2004]).*
Fang, Y., et al., "Self-supported supercapacitor membranes: Polypyrrole-coated carbon nanotube networks enabled by pulsed electrodeposition", "Journal of Power Sources", Jul. 23, 2009, pp. 674-679, vol. 195.
Pinault, M., et al, "Evidence of Sequential Lift in Growth of Aligned Multiwalled Carbon Nanotube Multilayers", "Nano Letters", 2005, pp. 2394-2398, vol. 5, No. 12.
Pinault, M., et al., "Growth of multiwalled carbon nanotubes during the initial stages of aerosol-assisted CCVD", "Carbon", Jul. 26, 2005, pp. 2968-2976, vol. 43.
Note: For the non-patent literature citations that no month of publication is indicated, the year of publication is more than 1 year prior to the effective filing date of the present application.
Lagoutte et al., "Poly(3-methylthiophene)/Vertically Aligned Multiwalled Carbon Nanotubes: Electrochemical Synthesis, Characterizations and Electrochemical Storage Properties in Ionic Liquids"; Electrochimica Acta, vol. 130, pp. 754-765, Mar. 30, 2014.

* cited by examiner

METHOD FOR PREPARING A COMPOSITE, COMPOSITE THUS OBTAINED AND USES THEREOF

CROSS-REFERENCE TO RELATED APPLICATIONS

This application is a U.S. national phase under the provisions of 35 U.S.C. § 371 of International Patent Application No. PCT/EP11/61438 filed Jul. 6, 2011, which in turn claims priority of French Patent Application No. 1055526 filed Jul. 7, 2010. The disclosures of such international patent application and French priority patent application are hereby incorporated herein by reference in their respective entireties, for all purposes.

TECHNICAL FIELD

The present invention concerns the field of nanotechnologies and more particularly the field of materials of nanocomposite type containing nano-objects of elongate shape such as nanotubes.

Therefore the present invention concerns a method for preparing a composite material comprising an assembly of nanotubes which may in particular be aligned in an electrically conductive polymer matrix.

The present invention also concerns a composite material thus prepared and the different uses thereof.

STATE OF THE PRIOR ART

Nano-objects are currently the focus of particular interest on account of their original properties that are heightened in comparison with conventional materials. Indeed, nano-objects and in particular nanotubes, such as carbon nanotubes (CNTs), exhibit numerous advantages both regarding their structure and physical properties and regarding their potential applications notably in membranes, physical separation devices, electrodes, composite materials, thermal, optical or electronic devices, and in catalyst carriers, devices to store or convert chemical, light, electric, mechanical energy, etc.
. . . .

Nano-objects such as CNTs are used in composite materials such as nano-object/polymer or nano-object/resin materials, and in particular in CNT/polymer or CNT/resin materials. With said material it is possible not only to draw benefit from the electrical properties in particular of nano-objects, and even to improve the same, but also to obtain a material that is more easily manageable.

In the field of composite materials, CNTs are not necessarily aligned, or ordered in any particular fashion. On the contrary, they are often «dispersed». Composites are mostly impregnated using pressure—and/or temperature-assisted techniques. At the present time, the most promising composites in terms of development are those having a polymer matrix and of interest for applications with high added value in particular in the aerospace or energy sectors and in the conductive plastics industry.

In the literature, a high number of studies are reported relating to methods for preparing composite materials based on nano-objects. For example, 352 publications were counted in 2008 in which the subject-matter related to composite materials mostly containing CNTs but also nanotubes in manganese oxide in the sole area of supercapacitors.

First, CNTs were used as electrically conductive materials in insulating polymer matrices. International application WO 2008/005431 by Renselaer Polytechnic Institute published on 10 Jan. 2008 describes a nanocomposite formed from aligned CNTs having a length of between 100 µm and 800 µm and from a non-electrically conductive polymer. This polymer is dissolved in the solvent used for electrochemistry in the form of an ionic liquid. The dissolved non-conductive polymer and the ionic liquid impregnate the nanotubes. The assembly is immersed in ice to crystallise the polymer, then washed in ethanol to remove the ionic liquid without the insoluble non-conductive polymer. A flexible nanocomposite is thereby obtained apparently having electrode capacitances (by means of the porosity obtained) that are close to 37 F/g, i.e. close to that of CNTs alone.

As a variant, patent application US 2008/039557 by Tsinghua University and Hon Hai Precision Industry published on 14 Feb. 2008 proposes a composite material having good thermal and electric properties. From a structural viewpoint, this composite material comprises CNTs having a length of 100 to 200 µm, aligned and incorporated/impregnated in a resin such as an epoxy resin, an acrylic resin, silicon or thermally conductive grease. This composite material is prepared by impregnating the CNTs with the liquid resin which is then solidified.

The use of CNTs in electrically conductive polymer matrices has also drawn attention in recent years. Among the conductive polymers, polyaniline remains the subject of extensive research for its impressive results and despite its defects such as poor stability or a reduced potential window.

Patent application US 2003/077515 by Chen et al. published on 24 Apr. 2003 describes an electrically conductive composite material containing CNTs and conductive polymers such as polypyrrole. This composite material is prepared by electropolymerization of different monomers on CNTs whose size does not exceed 100 µm, said CNTs being in suspension in a solution. Electropolymerization can be carried out either at a constant or cyclic potential, or with a constant current. The fact that it is performed on CNTs dispersed in solution leads to composite materials in which the CNTs are not aligned. In addition, the composite materials so prepared do not appear to be self-supported since it is envisaged that they are supported by a conductive element such as an electrode (see, paragraph [0065]).

International application WO 03/049219 by The Trustees of Boston College published on 12 Jun. 2003 proposes an electrode material containing CNTs coated with a conductive polymer which is preferably polypyrrole. The CNTs used in this document have a size of 10 µm or less. Two techniques are envisaged for preparing said material: the first consists in dissolving the conductive polymer in a suitable solvent which is later removed, and the second consists in in situ polymerization. This polymerization is performed in potentiostatic mode and directly on the substrate on which the CNTs were synthesized.

As a variant, International application WO 2008/016990 by ADA Technologies, Inc. published on 7 Feb. 2008 proposes high performing, nanocomposite supercapacitors. The proposed supercapacitor is prepared with two electrodes of aligned CNT having a size of more than 75 µm and an electrolyte of gel polymer electrolyte type used with ionic liquids or ILGPE (Ionic Liquid incorporated Gel Polymer Electrolyte).

Finally, the article by Fang et al., 2010 («Self-supported supercapacitor membranes: Polypyrrole-coated carbon nanotube networks enabled by pulsed electrodeposition» *Journal of Power Sources*, vol. 195, pages 674-679) proposes a self-supported supercapacitor membrane consisting of a network of CNTs coated with polypyrrole. The CNTs, the length of which is of the order of 50 µm, are used in this composite not in aligned form but filtered through a membrane to form an interwoven network. It is the presence of this membrane which makes the nanocomposite self-supporting. In other words, the CNTs are self-supported before depositing the conductive polymer and this property is not the consequence of the method implemented to deposit the conductive polymer. This depositing is performed electrochemically in an aqueous electrolytic 0.1 M KCl solution in pulsed potentiostatic mode i.e. the use of pulses at constant potential (see FIG. 1A, below).

The inventors have set themselves the objective of proposing a method with which it is possible to prepare a composite material comprising aligned CNTS coated or impregnated with a conductive polymer obtained from a wide range of monomers i.e. from monomers having most diverse chemical properties in particular in terms of solubility, said composite material having electrical properties equal to or higher than those of materials in the state of the art and being self-supported without the need for additional steps before or after the method to impart of this property.

DESCRIPTION OF THE INVENTION

The present invention allows the solving of the technical problems such as previously defined and the achieving of the objective set by the inventors.

Indeed the work by the inventors has made it possible to prepare a composite material comprising CNTs aligned in the form of a carpet and on which an electrically conductive polymer matrix is deposited, allowing a self-supported composite material to be obtained without any treatment other than the electrochemical depositing of the matrix.

The technical solution proposed by the inventors corresponds to a particular choice with respect to the method for depositing the conductive polymer matrix on the CNTs, namely electrochemical deposit in pulsed galvanostatic mode.

Indeed the inventors have effectively shown that the electrochemical depositing of a conductive polymer on CNTs in carpet form using a pulsed galvanostatic technique allows the electropolymerization of this matrix throughout the entire depth of the carpet. In addition, the morphology of the carpet is in no way modified by this electropolymerization in pulsed galvanostatic mode.

This electropolymerization technique in pulsed galvanostatic mode can be implemented in most varied electrolytic solutions ranging from conventional electrolytic solutions of the type containing a protic or aprotic solvent and a salt to much more viscous solutions such as solutions containing a solvent of ionic liquid type. This variety of electrolytic solutions which can be used leads to a wide choice of monomers, precursors of the conductive polymer matrix. Irrespective of the monomer(s) used, a suitable electrolytic solution can always be found.

Said depositing can be implemented on very long carpets of CNTs, of up to several millimetres. As previously described, the composite materials of the prior art which comprise a carpet of CNTs in an electrically conductive polymer matrix are of relatively small size i.e. less than 200 µm.

In addition, said depositing can be performed over a wide CNT density range, over a wide CNT mean diameter range, and for CNTs that are more or less structured i.e. having structural defects to a greater or lesser extent.

Finally, the composite material of the invention is not only self-supported but also has certain flexibility imparted by the electrically conductive polymer matrix.

Of interest is the fact that the present invention applies not only to CNTs in carpet form but also more generally to all nano-objects of elongate shape that are electrically conductive or semiconductive, whether dispersed or aligned.

The present invention therefore proposes a method for preparing a composite material comprising electrically conductive or semiconductive nano-objects of elongate shape and an electrically conductive polymer matrix, said method comprising a step consisting in electrochemically depositing said matrix on said nano-objects via a pulsed galvanostatic technique.

By «nano-object» in the present invention is meant an organic or inorganic object of nanometric size i.e. at least one of the external dimensions thereof is of nanometric size.

By «nano-object of elongate shape» in the present invention is meant a nano-object such as previously defined, of which at least two of its external dimensions are of nanometric size, the 3rd of its dimensions being at least 2 times, in particular at least 5 times, more particularly at least 10 times, and further particularly at least 50 times greater than the two other dimensions.

By «electrically conductive nano-object of elongate shape» in the present invention is meant a nano-object of elongate shape such as previously defined allowing the passing of the electric current and permitting the free movement of the electric charges.

By «electrically semiconductive nano-object of elongate shape» in the present invention is meant a nano-object of elongate shape such as previously defined having intermediate electric conductivity between metals and insulators. The conductivity properties of a semiconductor are mainly influenced by the charge carriers (electrons or electronic vacancies) of the semiconductor. These properties are determined by two particular energy bands, called the valence band (corresponding to the electrons involved in covalent bonds) and the conduction band (corresponding to electrons in the excited state and capable of moving in the semiconductor). The «gap» represents the difference in energy between the valence band and the conduction band.

The electrically conductive or semiconductive nano-objects of elongate shape advantageously used in the present invention are chosen from among nanofibers, nanotubes and nanowires.

By «nanofiber» in the present invention is meant a one-dimensional or substantially one-dimensional structure having a thickness or diameter varying from 0.5 nm to 1000 nm, in particular from 1 nm to 500 nm and further particularly between 2 nm and 50 nm.

By «nanotube» in the present invention is meant a tubular and/or cylindrical structure whose inner diameter varies between 0.5 nm and 100 nm, in particular between 0.5 nm and 50 nm, and more specifically between 0.5 nm and 10 nm.

By «nanowire» in the present invention is meant a nanofiber such as previously defined, that is solid.

Electrically conductive or semiconductive nano-objects of elongate shape and in particular the nanofibers, nanotubes and nanowires used in the present invention are in a material chosen from the group formed by carbon, silicon, gold, silver, tantalum, nickel, platinum, copper, molybdenum, palladium, steel, stainless steel, zinc, boron nitride, zinc oxide, manganese oxide, gallium nitride, silicon nitride, tungsten disulfide, molybdenum disulfide, indium phosphide, tungsten selenide, molybdenum selenide, titanium dioxide, silicon dioxide, molybdenum trioxide and mixtures thereof.

Among the electrically conductive or semiconductive nano-objects of elongate shape advantageously used in the present invention are carbon nanotubes. It is recalled that a carbon nanotube is defined as a concentric winding of one or more layers of graphene (mesh of carbon hexagons). The term:

Single-Wall NanoTube (SWNT) is used if there is only a single layer of graphene;

Double-Wall NanoTube (DWNT) is used if there are two layers of graphene;

Multi-Wall NanoTube (MWNT) if there are several layers of graphene.

The present invention applies to any type of carbon nanotubes irrespective of their preparation method. For example, the carbon nanotubes used in the present invention may be nanotubes with a single graphene layer (SWNTs), nanotubes with two layers of graphene (DWNT), nanotubes with several layers of graphene (MWNT) or one of the mixtures thereof.

The one skilled in the art knows different methods which can be used to prepare nano-objects such as previously defined.

As more particular examples of methods which can be used to prepare nanowires, mention can be made of methods whereby a substrate is etched using lithography or etching techniques, a nanowire is grown using chemical vapour deposition methods (CVD) from thin metal films such as gold.

As more particular examples of methods which can be used to prepare carbon nanotubes, mention can be made of physical methods based on carbon sublimation such as electric arc, laser ablation or solar furnace methods, and chemical methods such as the CVD method or method in which carbon sources are pyrolysed on metal catalysts. One particularly suitable method for preparing CNTs is the CVD-injection method notably described in the article by Pinault et al., 2005, «Growth of multiwalled carbon nanotubes during the initial stages of aerosol-assisted CCVD», Carbon 43, 2968, and the article by Pinault et al., 2005, «Evidence of sequential lift in growth of aligned multi-walled carbon nanotube multilayers», Nano Lett. 5 (12), 2394.

The electrically conductive or semiconductive nano-objects of elongate shape used in the present invention may have any chirality and any length. Advantageously, these nano-objects have a length of between 10 nm and 2 cm, in particular between 20 nm and 1 cm, more particularly between 50 nm and 8 mm, and further particularly between 100 nm and 5 mm.

In the present invention, the electrically conductive or semiconductive nano-objects of elongate shape can be used in a conformation relative to one another that is dispersed, staggered or aligned. By «staggered conformation» is meant substantially straight nano-objects that are not necessarily aligned with each other. Alignment and tortuosity of nano-objects are parameters accessible via X-ray measurement.

On the contrary, in an aligned conformation, the nano-objects are used aligned with each other in a vertical array. In this conformation, they are generally and substantially perpendicular to a support. The term «carpet» is used and in particular a carpet of nanofibers, nanotubes or nanowires. The term «forest» or «network» is also used. An aligned conformation can be obtained as soon as the nano-objects are prepared, or once they have been prepared typically using filtration techniques particularly in the core of the nanotubes, or transverse flow techniques transverse to the axis of the nanotubes. Advantageously, in the method of the invention, the electrically conductive or semiconductive nano-objects of elongate shape are in the form of a carpet in which the nano-objects are aligned.

By «electrically conductive polymer matrix» in the present invention is meant a structure in the form of a film, whether porous or non-porous, on the surface of the nano-objects used in the method of the invention, and essentially consisting of one (or more) electrically conductive (co) polymers.

Par «electrically conductive (co)polymer» in the present invention is meant a (co)polymer whose main polymeric chain and optionally the side chains have at least one double bond or at least one aromatic ring. Typically, an electrically conductive (co)polymer is obtained by polymerization of one (or more) monomers carrying a double bond and/or an aromatic ring and optionally a heteroatom such as an oxygen atom, a nitrogen atom, a sulfur atom or a fluorine atom.

The polymer matrix used in the present invention is advantageously formed of one (or more) (co)polymer(s) chosen from among the polyfluorenes, polypyrenes, polyazulenes, polynaphtalenes, poly-pyrroles, polycarbazoles, polyindoles, polyazepines, polyanilines, polythiophenes, poly(p-phenylene sulfides), polyacetylenes and poly(p-phenylene vinylenes). Advantageously, the polymer matrix used in the present invention is advantageously formed of one (or more) (co)polymer(s) chosen from among poly-pyrroles, polycarbazoles, polyanilines and polythiophenes.

The one skilled in the art knows different monomers which can be used to obtain the above-listed polymers via polymerization.

As examples, polypyrroles can be obtained by polymerization of one (or more) monomer(s) chosen from among pyrrole and the derivatives of pyrrole. A pyrrole derivative is advantageously a pyrrole substituted by at least one substituent chosen from among a C1 to C10 and in particular C1 to C5 (hetero)alkyl, straight-chain, branched or cyclic, optionally substituted; a halogen atom; an —OH group; a —COOH group; a C2 to C20 and in particular C2 to C10 alkoxyalkyl, optionally substituted; an alkoxy polyether; an alkylene polyether; a C3 to C20 and in particular C4 to C16 (hetero)aryl, optionally substituted or a C3 to C20 and in particular C4 to C16 (hetero)aralkyl, optionally substituted. A pyrrole derivative may also be a pyrrole substituted by at least two substituents forming a C1 to C10 and in particular C1 to C5 bridge group, optionally comprising a heteroatom. As examples of pyrrole derivatives which can be used the following can be cited: 3-methyl pyrrole, 3-ethyl pyrrole, 3-butyl pyrrole, 3-bromo pyrrole, 3-methoxy pyrrole, 3,4-dichloro pyrrole and 3,4-dipropoxy pyrrole.

By «optionally substituted» in the present invention is meant a group which can be substituted by —OH, —COOH, a halogen atom or C1 to C4 alkyl.

As examples, polycarbazoles can be obtained by polymerization of one (or more) monomer(s) chosen from among carbazole and carbazole derivatives. A derivative of carbazole is advantageously a carbazole substituted by at least one substituent chosen from among a C1 to C10, in particular C1 to C5 (hetero)alkyl, straight-chain, branched or cyclic, optionally substituted; a halogen atom; an —OH group; a —COOH group; a C2 to C20 and in particular C2 to C10 alkoxyalkyl, optionally substituted; an alkoxy polyether; an alkylene polyether; a C3 to C20 and in particular C4 to C16 (hetero)aryl, optionally substituted or a C3 to C20 and in particular C4 to C16 (hetero)aralkyl, optionally substituted. A derivative of a carbazole can also be a carbazole substituted by at least two substituents forming a C1 to C10 particularly C1 to C5 bridge group, optionally comprising a heteroatom.

As examples, polyanilines can be obtained by polymerization of one (or more) monomer(s) chosen from among aniline and aniline derivatives. A derivative of aniline is advantageously an aniline substituted by at least one substituent chosen from among a C1 to C10, in particular C1 to C5 (hetero)alkyl, straight-chain, branched or cyclic, optionally substituted; a halogen atom; an —OH group; a —COOH group; a C2 to C20 and in particular C2 to C10 alkoxyalkyl, optionally substituted; an alkoxy polyether; an alkylene polyether; a C3 to C20 and in particular C4 to C16 (hetero)aryl, optionally substituted or a C3 to C20 and in particular C4 to C16 (hetero)aralkyl, optionally substituted. A derivative of aniline may also be an aniline substituted by at least two substituents forming a C1 to C10 and in particular C1 to C5 bridge group, optionally comprising a heteroatom.

As examples, polythiophenes can be obtained by polymerization of one (or more) monomer(s) chosen from among thiophene and thiophene derivatives. A thiophene derivative is advantageously a thiophene substituted by at least one substituent chosen from among a C1 to C10 in particular C1 to C5 (hetero)alkyl, straight-chain, branched or cyclic, optionally substituted; a halogen atom; —OH group; —COOH group; C2 to C20, in particular C2 to C10 alkoxyalkyl, optionally substituted; an alkoxy polyether; an alkylene polyether; a C3 to C20, in particular C4 to C16 (hetero)aryl, optionally substituted or a C3 to C20 in particular C4 to C16 (hetero)aralkyl, optionally substituted. A derivative of a thiophene may also be a thiophene substituted by at least two substituents forming a C1 to C10 in particular C1 to C5 bridge group optionally comprising a heteroatom. As examples of thiophene derivatives which can be used the following can be cited: 3-thiophene acetic acid, 3,4-ethylene dioxythiophene, 3-methyl thiophene, 3-ethyl thiophene, 3-butyl thiophene, 3-bromo thiophene, 3-methoxy thiophene, 3,4-dichloro thiophene and 3,4-dipropoxy thiophene.

The method for preparing a composite material according to the present invention is characterized by the use of a pulsed galvanostatic mode (or pulsed galvanostatic technique) for the electrochemical depositing of the electrically conductive polymer matrix on the electrically conductive or semiconductive nano-objects of elongate shape.

By «galvanostatic mode» in the present invention is meant an electropolymerization technique with the application of a constant current density.

By «pulsed galvanostatic mode» in the present invention is meant an electropolymerization technique with at least two successive applications of a constant current density for a period $t_{on}$, the applications of current also being called «pulses» and being separated by a rest period $t_{off}$ without the application of any current or voltage.

The expressions «pulsed galvanostatic mode» and «sequenced galvanostatic mode» are equivalent and interchangeable herein.

The current density applied during the $t_{on}$ periods is between 0.5 and 10 mA/cm$^2$, in particular between 1 and 8 mA/cm$^2$, and more particularly between 2 and 6 mA/cm$^2$.

The duration of each $t_{on}$ period, according to the method of the present invention, is relatively long. Advantageously, the duration of each $t_{on}$ period is between 10 and 100 sec, in particular between 20 and 80 sec, and more particularly between 30 and 60 sec. Therefore in the pulsed galvanostatic technique used in the method of the invention, a constant current density is applied for ($t_{on}$) periods having a duration of between 10 and 100 sec, in particular between 20 and 80 sec, and more particularly between 30 and 60 sec.

The number of $t_{on}$ periods i.e. the number of pulses is typically between 10 and 500, in particular between 20 and 400, and more particularly between 40 and 300. However the one skilled in the art, for implementing a particular method, will be capable of determining the number of required pulses that are necessary and sufficient on the basis of the teaching of paragraph 4.2 below.

The duration of each $t_{off}$ period according to the method of the present invention, must be much longer than the periods of application of the current, in particular when the nano-objects of elongate shape are used at a high density as in carpet form. Indeed, when the pulses are applied, the polymer matrix is deposited on the nano-objects, and a long rest period ($t_{off}$) enables the monomer(s) present in solution to diffuse within the nano-objects so as to regenerate the monomer(s) at this point. Therefore said rest period ($t_{off}$) is necessary for the diffusion and renewal of monomers within the carpet.

Advantageously, the duration of each $t_{off}$ period is longer than the duration of each $t_{on}$ period by a factor of 2, in particular by a factor of 3, more particularly by a factor of 4, and further particularly by a factor of 5. In other words, in the pulsed galvanostatic technique used in the method according to the invention, the duration of each rest period ($t_{off}$) is greater than the duration of each period of application of a constant current density ($t_{on}$) by a factor of 2, in particular by a factor of 3, more particularly by a factor of 4, and further particularly by a factor of 5. Advantageously the duration of each $t_{off}$ period is between 20 and 600 sec, in particular between 50 and 500 sec, and more particularly between 100 and 400 sec.

However, the rest period ($t_{off}$) will depend on factors such as viscosity of the solvent, current density, pulse time. It is easy however to determine for each experiment whether or not the rest period ($t_{off}$) is sufficient. All that is required is to observe the appearance of the curve of the potential during electropolymerization. With a sufficient rest time, the reached potential at first decreases and then remains near-constant throughout the entire synthesis (cf. FIGS. 11A and 11B below).

More particularly, the method according to the present invention comprises the steps of:

a) contacting the electrically conductive or semiconductive nano-objects of elongate shape, in particular such as previously defined, with a solution (hereinafter designated solution (S)) containing the monomer(s) precursor(s), of said conductive polymer matrix;

b) polarising said nano-objects in pulsed galvanostatic mode, after which said conductive polymer matrix is electrochemically deposited on said nano-objects.

Prior to step (a) of the method according to the invention, the electrically conductive or semiconductive nano-objects of elongate shape can be subjected to an oxidizing treatment (or pre-treatment) i.e. intended to oxidize the surface of the nano-objects used and/or to prepare the surface for subsequent oxidation through the formation of radicals. Oxidization modifies the surface of the nano-objects in particular by fixing and/or adding, onto the ends or defects of the nano-objects, groups that are rich in oxygen such as groups of carboxylic (—COOH), hydroxyl (—OH), alkoxy (—OX with X representing an alkyl group, acyl group or aroyl group), and carbonyl(—C=O), percarbonic (—C—O—OH) and sometimes amide type (—CONH).

Said oxidizing treatment is based on two major types of surface modifications using:

physical treatments such as plasma treatment in particular oxygen plasma, UV treatment, X-ray or γ-ray treatment, electron and heavy ion irradiation treatment, or chemical treatments such as treatment with alcoholic potash, treatment with a strong acid, (HCl, $H_2SO_4$, $HNO_3$, $HClO_4$), treatment with sodium hydroxide, treatment with a strong oxidizer ($KMnO_4$, $K_2Cr_2O_7$, $KClO_3$ or $CrO_3$ in hydrochloric acid, sulfuric acid or nitric acid), treatment with ozone and heat treatment in an oxygenated atmosphere ($O_2$, $H_2O$, . . . ).

Said nano-objects, once this oxidizing pre-treatment applied, can be in the form of oxidized nano-objects i.e. negatively charged.

At step (a) and as previously explained, the solution (S) can be in the form of a pure, protic or aprotic solvent when the electrically conductive or semiconductive nano-objects of elongate shape are negatively charged; in the form of an electrolytic solution containing as solvent a protic or aprotic solvent; or in the form of an ionic liquid.

By «protic solvent» in the present invention is meant a solvent which comprises at least one hydrogen atom capable of being released in proton form and advantageously chosen from the group consisting of acidified or basic water, deionised water and distilled water, acetic acid, hydroxylated solvents such as methanol and ethanol, liquid glycols of low molecular weight such as ethylene glycol, and mixtures thereof.

By «aprotic solvent» in the present invention is meant a solvent which is not able to release or to accept a proton under non-extreme conditions and advantageously chosen from among the halogenated alkanes such as dichloromethane; dimethylformamide (DMF); the ketones such as acetone or 2-butanone; acetonitrile; tetrahydrofuran (THF); N-methylpyrrolidone (NMP); dimethyl sulfoxide (DMSO) and mixtures thereof.

In addition, the solvent which can be used in the present invention may be a mixture of at least one protic solvent with at least one aprotic solvent. The electrolytic solution which can be used in the present invention, in addition to a solvent such as previously defined, contains an electrolyte in the form of a salt dissolved in the solvent. The anion of this salt can be chosen from among inorganic anions such as $Br^-$, $Cl^-$, $HCO_3^-$, $H_2PO_4^-$, $Cr_2O_4^{3-}$, $BF_4^-$ or $PF_6^-$; organic anions; polymeric anions and biological anions. The cation of this salt is a metal cation such as $Li^+$, $Na^+$, $Mg^{2+}$, $Cu^{2+}$, $Zn^{2+}$ and $Al^{3+}$.

Other examples of solvents and electrolytes which can be used in the present invention are given in paragraphs [0040] to [0048] of International application WO 2003/077515.

Any ionic liquid containing a cation associated with an anion can be used in the present invention. Among these ionic liquids, mention can be made of ionic liquids containing quaternary ammonium ions such as 1-ethyl-3-methyl imidazolium, 1-methyl-3-propyl imidazolium, 1-methyl-3-isopropyl imidazolium, 1-butyl-3-methyl imidazolium, 1-ethyl-2,3-dimethyl imidazolium, 1-ethyl-3,4-dimethyl imidazolium, N-propyl pyridinium, N-butyl pyridinium, N-tert-butyl pyridinium, N-tert-butanol-pentyl pyridinium, N-methyl-N-propyl-pyrrolidinium, N-butyl-N-methylpyrrolidinium, N-methyl-N-pentyl pyrrolidinium, N-propoxyethyl-N-methyl pyrrolidinium, N-methyl-N-propyl piperidinium, N-methyl-N-isopropyl piperidinium, N-butyl-N-methyl piperidinium, N—N-isobutylmethyl piperidinium, N-sec-butyl-N-methyl piperidinium, N-methoxy-N-ethylmethyl piperidinium and N-ethoxyethyl-N-methyl piperidinium ions. Ionic liquids can also be cited which contain ammonium ions such as the butyl-N—N,N,N-trimethyl ammonium, N-ethyl-N,N-dimethyl-N-propyl ammonium, N-butyl-N-ethyl-N,N-dimethyl ammonium ions, associated with any anion such as the tetrafluoroborate ($BF_4^-$), hexafluorophosphate ($PF_6^-$), bis(trifluoromethane-sulfonyl) amide (TFSI) or bis(trifluorosulfonyl)amides (FSI) anions.

Other ionic liquids which can be used in the present invention are described in International application WO 2008/016990 (page 18, lines 5 to 23).

The precursor monomer(s) of the conductive polymer matrix is(are) present in the solution (S) in a maximum quantity determined in relation to their solubility in the solvent used.

The electrochemical depositing reaction of the conductive polymer matrix on the nano-objects of elongate shape i.e. step (b) of the method according to the invention is advantageously performed in the absence of oxygen i.e. in an inert atmosphere. For example an inert gas such as argon or nitrogen can be used to generate this inert atmosphere. The use of an inert atmosphere and the bubbling of an inert gas in the solution (S) allow the dissolving of any oxygen which may be present in this solution (S); enable the conductive polymer matrix to coat the surface of the nano-objects uniformly and continuously; and optionally allow an improvement in the electrochemical performance of the composite material obtained.

The method according to the present invention, and in particular step (b) of this method, is typically conducted in an electrochemical cell equipped with a reference electrode, a working electrode and a counter-electrode. The reference electrode is either of SCE type (Saturated Calomel Electrode) or an Ag/AgCl reference electrode, [KCl]=3 M, or optionally a mere platinum wire. The working electrode is formed by the electrically conductive or semiconductive nano-objects of elongate shape and the counter-electrode is a platinum mesh or platinum-coated titanium plate.

Typically, step (b) of the method according to the present invention lasts between 1 and 60 min, in particular between 2 and 45 min, and more particularly between 3 and 30 min. This step (b) is advantageously implemented at a temperature of between 10 and 50° C., in particular between 15 and 40° C., and more particularly at ambient temperature (i.e. at 22° C.±5° C.)

The present invention also concerns a composite material able to be prepared using the method of the invention such as previously defined. The composite material of the invention can be called a «nanocomposite» through the presence of nano-objects contained therein.

Advantageously, the density of the electrically conductive or semiconductive nano-objects of elongate shape in the material of the present invention may be variable. This density is advantageously between $10^4$ and $10^{13}$ nano-objects/$cm^2$ of material. It is therefore possible to obtain a material having a dense carpet of aligned nano-objects, the density being of the order of $10^9$ to $10^{13}$ nano-objects/$cm^2$, and in particular of the order of $10^9$ to $10^{11}$ nano-objects/$cm^2$.

The weight percentage of the electrically conductive polymer matrix expressed in relation to the total weight of the composite material of the invention is higher than 20%, in particular between 25 and 80%, and more particularly between 50 and 75%. The weight of the electrically conductive polymer matrix and the weight of the composite material can be obtained by Thermal Gravimetric Analysis (TGA) and/or by weighing.

The present invention therefore concerns a composite material able to be obtained using the method of the invention such as previously defined, in which the electrically conductive or semiconductive nano-objects of elongate shape are in the form of a carpet of aligned nano-objects.

Among the composite materials according to the invention, mention can advantageously be made of composite materials in which the electrically conductive or semiconductive nano-objects of elongate shape are CNTs in carpet form and having a length of more than 200 μm.

The composite materials of the invention such as those comprising CNTs and in particular CNTs in carpet form are in particular self-supported and flexible materials. By «self-supported material» in the present invention is meant a material which has mechanical resistance without requiring any treatment before or after the method of the invention such as metallization of the nano-objects, the gluing of the material onto a collector that is rigid or plastic or even electrically conductive.

Finally, the present invention concerns the use of said composite materials, or which can be prepared using the method of the invention, in the positive/negative electrodes of a supercapacitor or of batteries, in electrodes for photovoltaics, in materials for $CO_2$ storage or in electrodes for electrochemical sensors. Therefore, the present invention concerns a positive/negative electrode of a supercapacitor or of a battery, an electrode for photovoltaics, a material for $CO_2$ storage or an electrode for electrochemical sensors comprising a composite material according to the invention or which can be prepared with the method of the invention.

Other characteristics and advantages of the present invention will become further apparent to the one skilled in the art on reading the non-limiting examples below given by way of illustration, with reference to the appended Figures.

DETAILED DESCRIPTION OF PARTICULAR EMBODIMENTS

1. Description of the Device of the Invention

Figure 1:
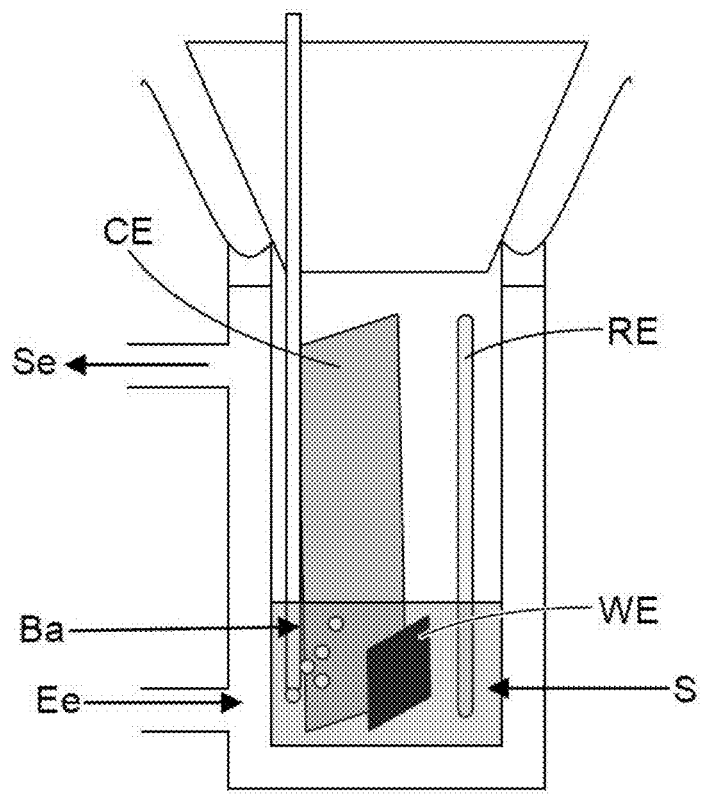
FIG. 1 schematises the device used to implement the method of the invention.

The device used in the method of the invention schematised in FIG. 1 comprises an electrochemical cell with three electrodes.

This cell comprises (1) a working electrode (WE) formed by the nano-objects of elongate shape, in particular the CNTs and more particularly the carpet of CNTs (2), a counter-electrode (CE) such as a platinum-coated titanium plate and (3) a reference electrode (RE) e.g. a silver wire.

In addition, the electrochemical cell is held in a thermostat-controlled bath, in particular at 30° C. This thermostat-controlled bath may be a water circulation bath with a water inlet (Ee) and water outlet (Se).

The electrolytic solution (S) contacted with these electrodes in the electrochemical cell comprises the monomers which, via polymerization, allow the polymer matrix to be obtained in solution, the monomers and polymer matrix being such as previously defined. In the examples below the solution (S) used is an ionic liquid solution (EMIT-FSI) containing 0.2 M 3-methylthiophene (3MT or MeT). The polymer obtained and deposited on the CNT carpet is poly(3-methylthiophene) (P3MT or PMeT).

When implementing the method of the invention and in particular during polymerization, bubbling of argon (Ba) can be maintained in the solution (S) allowing maintaining of the argon content and gentle mixing of this solution.

2. Embodiments

As previously explained, the essential feature of the method according to the invention is the use of a sequenced galvanostatic mode for depositing, on the working electrode, the polymer obtained from the monomers present in the solution (S).

Figure 2:
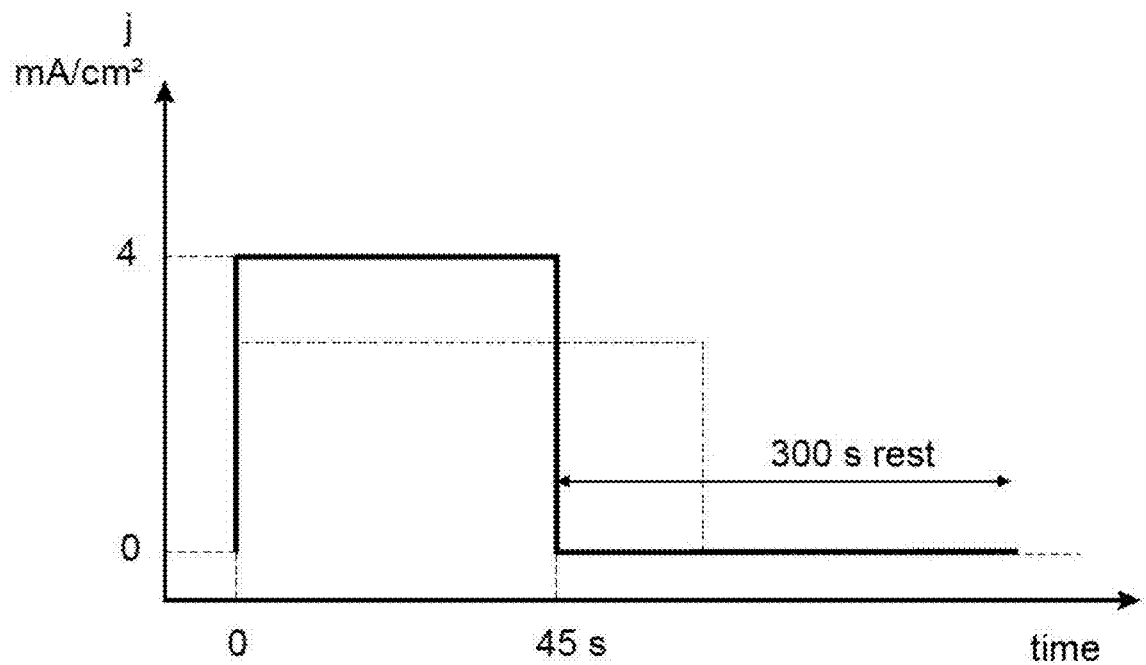
FIG. 2 illustrates the profiles of the pulses used for electrochemical depositing.

FIG. 2 shows the pulse profile of the current used. Tests to vary this profile were conducted so that the same quantity of electricity was passed during polymerization so that it was possible systematically to obtain the same $m_{conductive\ polymer}/m_{cnt}$ ratio.

The solid line in FIG. 2 illustrates the conventional profile, the dotted line another profile allowing the same charge to be passed (the areas under curves are identical).

With this method, an electrically conductive polymer/carbon nanotube nanocomposite (ECP/CNT) is obtained in which the CNT weight is of the order of 20 to 25% relative to the total weight of the nanocomposite. This value was verified by TGA analysis and by weighing.

3. Characterisation of the Nanocomposite Obtained 3.1. Proof of the «Nanostructuring» Effect on Capacitance Values.

Figure 3:
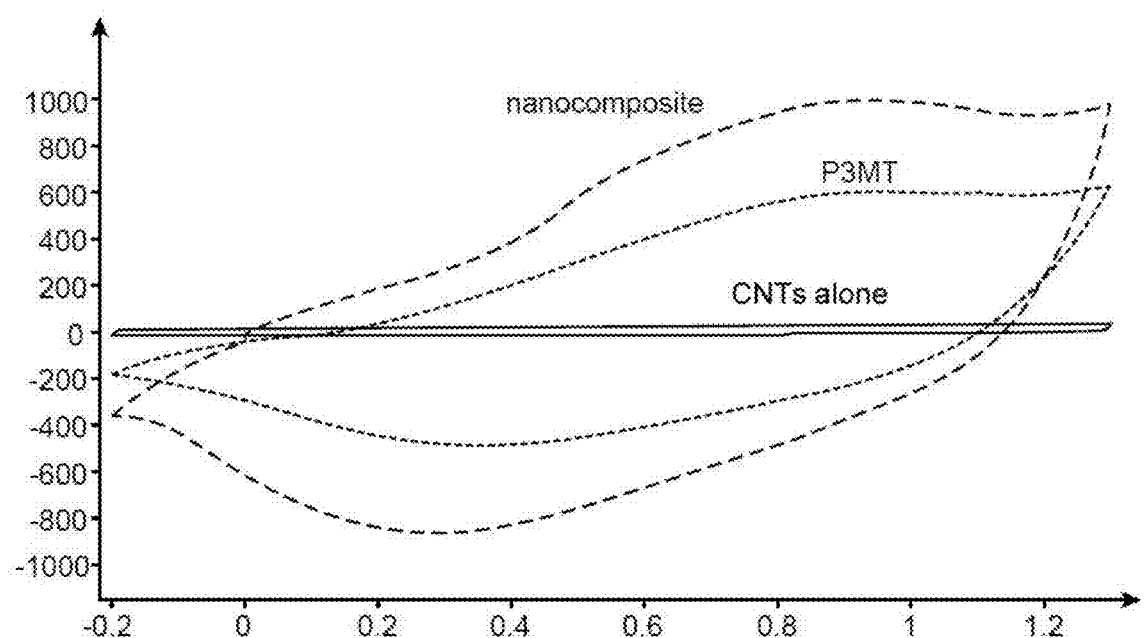
FIG. 3 gives the cyclic voltammetry curves obtained for the carbon nanotubes («CNTs alone», C=3-6 F/g), for the polymer alone («P3MT», C=80-100 F/g) and for the nanocomposite of the invention («nanocomposite», C=130-140 F/g); v=5 mV/s.

Cyclic voltammetry (CV) studies were carried out (FIG. 3). For example, these studies allowed it to be shown that the area under curve corresponding to the nanocomposite is greater than the sums of the areas of the two other curves i.e. curve of the P3MT polymer and curve of CNTs alone.

This nanostructuring is a first indication of the good distribution of the P3MT along the CNTs.

3.2. Proof of the Polymerization of the Monomer Along the CNTs.

Measurement of the distribution of the sulphur element by EDX probe on the thickness of the carpet made it possible to verify that the P3MT polymer was present along the entire length of the aligned tubes. On the contrary, in continuous galvanostatic mode, the polymer does not penetrate along the entire length of the carpet which clearly illustrates the benefit of using a pulsed galvanostatic mode.

Similarly, the transmission electron microscopy images (TEM) shown in FIG. 4 clearly show the coating of the CNTs by the conductive polymer (P3MT). The homogeneous distribution of the conductive polymer can distinctly be seen on the tubes and, in addition, it is possible to determine the thickness of the deposited film and this, for two different operating modes.

Figures 4A, 4B:
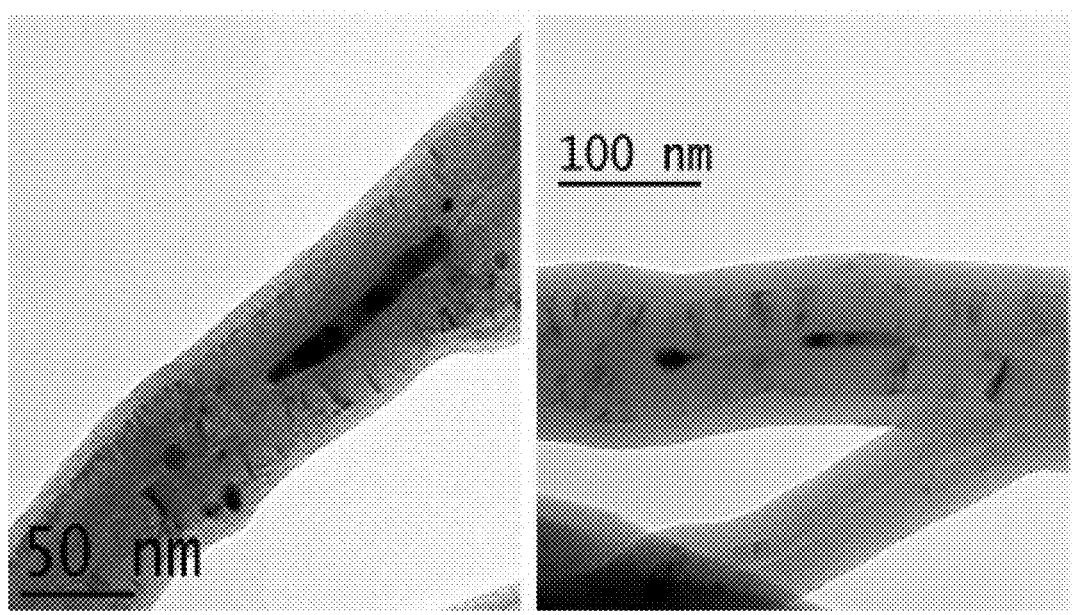
FIG. 4 gives transmission electron microscope images of two nanocomposites produced according to two operating conditions: pulsed galvanostatic mode with 50 sequences (FIG. 4A) and 75 sequences (FIG. 4B).

For example, for a method using a pulsed galvanostatic mode with 50 sequences, the polymer has a thickness of 8 nm (FIG. 4A), whilst, for a pulsed galvanostatic mode with 75 sequences, this thickness is 18 nm (FIG. 4B).

3.3. Measurement of Capacitances.

Figure 5A:
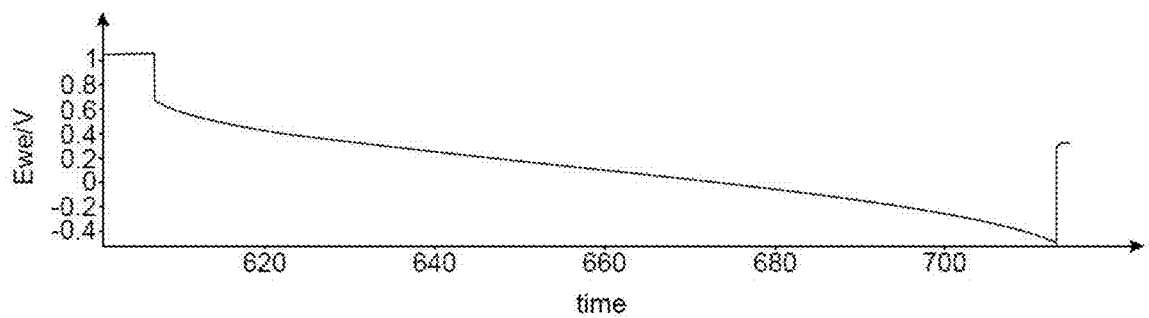
FIG. 5 shows the discharge curves of a P3MT/CNT nanocomposite according to the invention at 10 mA/cm$^2$ (FIG. 5A) and at 5 mA/cm$^2$ (FIG. 5B).
Figure 5B:
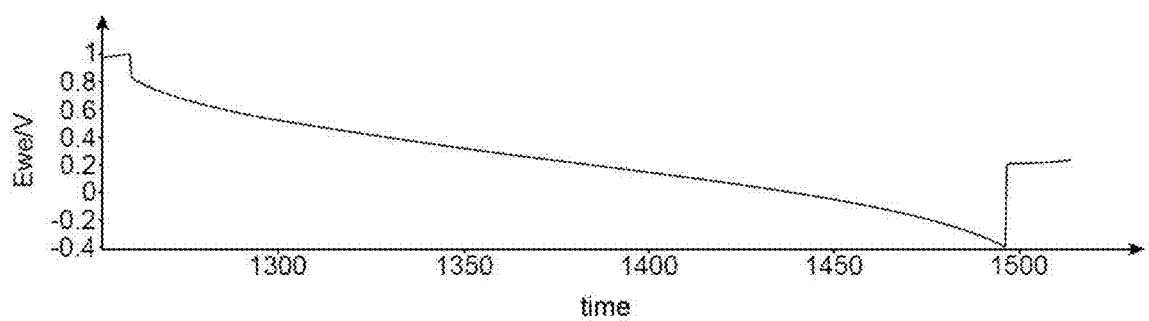

The capacitances were measured by conducting charge/discharge cycles with constant current density. FIG. 5 illustrates two examples with J=10 mA/cm$^2$ (FIG. 5A) and J=5 mA/cm$^2$ (FIG. 5B), these values frequently being used for electrochemical storage applications.

The capacitances were measured using the slope of the «straight line» obtained on the discharge curves. These capacitances per weight unit were between 135 F/g and 145 F/g for a P3MT/aligned CNT electrode. Calculated for the weight of P3MT alone, the capacitance is then 180 to 200 F/g.

TABLE 1

Electrochemical data on two nanocomposites according to the present invention, studied at 30° C. (line 1) and 60° C. (line 2) and compared with a prior art nanocomposite.

| Type | Capacitance | Electrolyte | Forming | Potential range |
|---|---|---|---|---|
| P3MT/aligned CNT at 30° C. | 140 F/g at 4 mA/cm$^2$ | EMIT-FSI | Electro-polymerization | −0.2 V to 1.2 V/Ag |
| P3MT/aligned CNT at 60° C. | 170 F/g at 4 and 10 mA/cm$^2$ | EMIT-FSI | Electro-polymerization | −0.2 V to 1.06 V/Ag |

TABLE 1-continued

Electrochemical data on two nanocomposites according to the present invention, studied at 30° C. (line 1) and 60° C. (line 2) and compared with a prior art nanocomposite.

| Type | Capacitance | Electrolyte | Forming | Potential range |
|---|---|---|---|---|
| P3MT at 30° C. | 85-100 F/g at 10 mA/cm$^2$ | EMIT-FSI | ground P3MT, AB, PTFE | −0.5 V to 1 V/Ag |

The prior art nanocomposite was prepared by mixing the powder of P3MT (previously ground in a mortar or using specific apparatus) with acetylene black (AB) and a polymer used as a binder (polytetrafluoroethylene or PTFE).

The values obtained with the nanocomposites of the invention are of great interest for ionic liquids.

However an ohmic drop was noted at a current density of 10 mA/cm$^2$, this drop being inherent in the viscosisty of the ionic liquid.

3.4. Self-Supported Samples

With respect to P3MT, the amount deposited has a large influence on the possible lift-off of the sample (one of the particular properties of the present invention).

This phenomenon occurs in the region of a P3MT content of 70-75% (content expressed in weight of P3MT to the total weight of the nanocomposite) for CNTs having a length of more than 150 μm. Said content is materialized in FIG. 9 below by the vertical dotted line. It is interesting to note that the maximum capacitance is found at around 80%, i.e. the self-supported (detached) material could have this maximum capacitance (cf. FIG. 9).

Figure 6A:
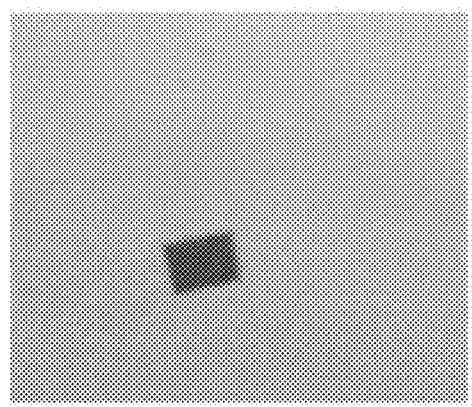
FIG. 6 gives photographs of a carpet of carbon nanotubes treated in accordance with the method of the invention, either laid flat (FIG. 6A) or held by a clip (FIG. 6B).
Figure 6B:
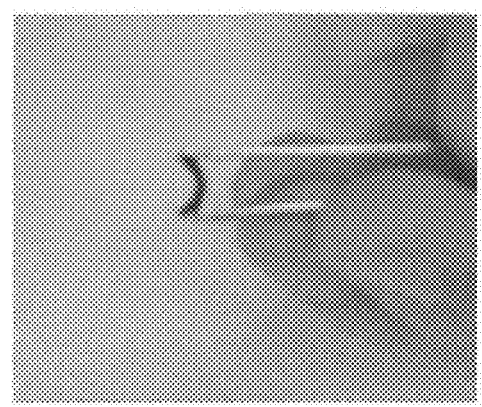

The samples are self-supported (with no current collector) i.e. it is in no way necessary to metallize the CNTs or to glue aluminium collectors to collect the current along the carpet. In addition, the carpet impregnated with conductive polymer becomes flexible. FIG. 6 shows a photo of a carpet of about 1 cm$^2$ with the deposited conductive polymer (FIG. 6A). In the photo in FIG. 6B it can be seen that the nanocomposite is very flexible after the depositing of the conductive polymer.

4. Study of the Different Parameters Influencing the Deposit and its Properties

The parameters examined were:
The current density: this has an influence on the rate of deposit of the conductive polymer and hence on the quality thereof.
the number of pulses: this controls the thickness of a deposit for a given density.
the form of the pulse: the rest time may effectively be an influencing factor on the quality of deposit.

4.1. Current Density Applied During Polymerization.

The current density applied for a pulse is an important factor for the properties of the material. A study was conducted with 3 different current densities: 2; 3; 4 mA·cm$^{-2}$, and using the same number of pulses and one same quantity of applied charge.

TABLE 2

| Current density J | 2 mA/cm$^2$ | 3 mA/cm$^2$ | 4 mA/cm$^2$ |
|---|---|---|---|
| Rate of electropolymerization | 82% | 87% | 92% |
| Capacitance | 85 F/g | 105 F/g | 110 F/g |

The increase in current density leads to an improvement in the rate of polymerization and in the capacitance of the material.

Figure 7A:
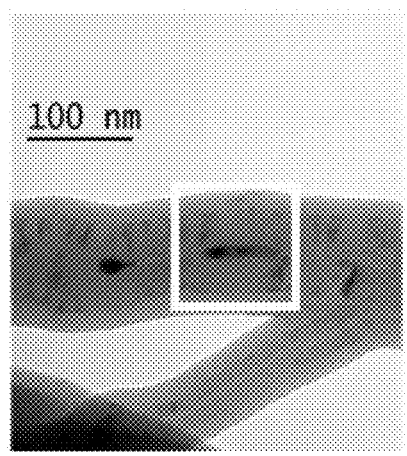
FIG. 7 gives transmission electron microscope images of two nanocomposites according to the invention in which the P3MT was deposited on the CNTs at 2 mA/cm$^2$ (FIGS. 7A and 7C) or at 4 mA/cm$^2$ (FIGS. 7B and 7D).
FIGS. 7C and 7D are detailed images respectively corresponding to the region materialised by a square in FIGS. 7A and 7B.
Figure 7B:
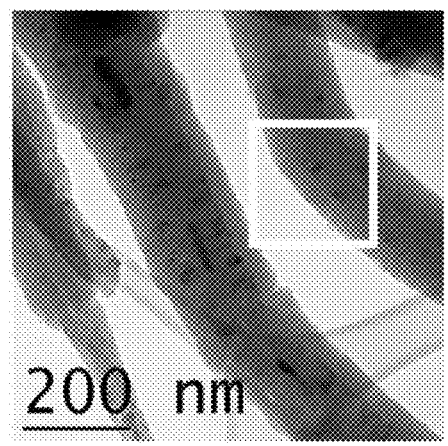
Figure 7C:
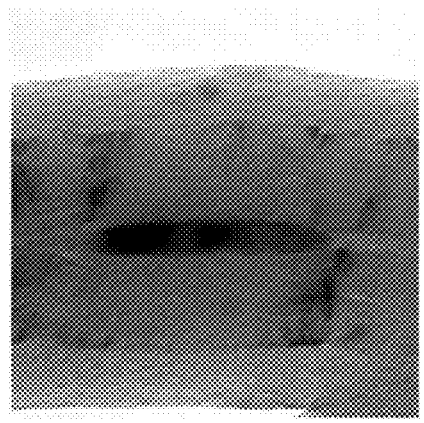
Figure 7D:
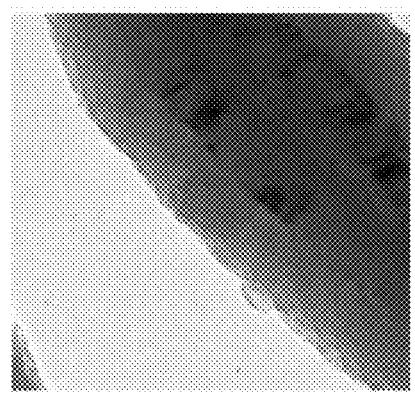

Analysis of Deposits by TEM:

As shown in FIG. 7, the layer deposited at 2 mA/cm² (FIG. 7A) is dense and homogeneous, contrary to the layer deposited at 4 mA/cm² (FIG. 7B). A larger magnified view of FIGS. 7A and 7B, respectively in FIGS. 7C and 7D, evidences waves on the surface of the sample in FIG. 7D. Since the kinetics of polymerization are more rapid at 4 mA/cm², a more porous structure is obtained.

The higher the current density, the more the structure of the deposited polymer will be porous and conversely. Said porosity can account for the improved capacitance. Since the solvent/polymer interface must be maximum, greater porosity improves capacitance.

4.2. Number of Pulses/Nanotube Length

These two parameters are difficult to be separated from each other. Samples derived not only from different synthesis but also from one same synthesis each have a different CNT length since positioned at a different point in the tubular quartz reactor used for the synthesis of CNTs.

Figure 8:
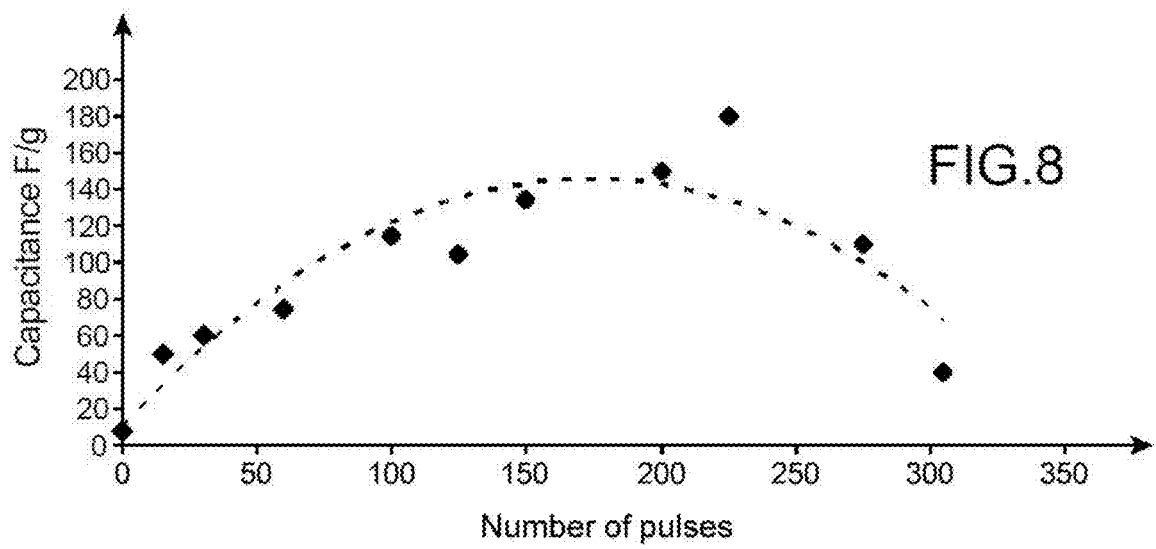
FIG. 8 illustrates the evolution of the capacitance of a nanocomposite according to the invention (CNT/P3MT) as a function of the number of pulses.

After a certain number of tests, the length of the carpet of carbon nanotubes does not appear to have any effect on capacitance for a small quantity of deposited polymer, almost as if there were no nanostructuring effect in this case. Indeed, irrespective of the length of the sample, the curve of the evolution of the capacitance as a function of the number of pulses will follow the evolution illustrated in FIG. 8, namely a bell-shaped profile.

The drop in capacitance can be accounted for by the fact that at one moment the P3MT will only be deposited on the surface of the carpet: the electrode then loses its «3D» structure and capacitance will be strongly affected thereby since the entire inner-side of the carpet no longer takes part in charge storage.

Figure 9:
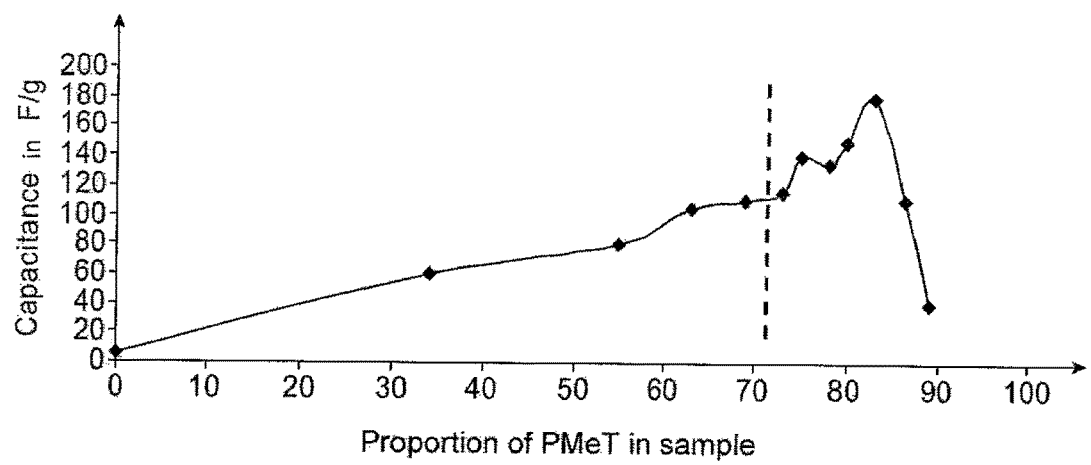
FIG. 9 illustrates the evolution of the capacitance as a function of the content of conductive polymer (P3MT). The dotted line shows the P3MT content on and after which the sample becomes self-supporting and flexible.
Figure 10A:
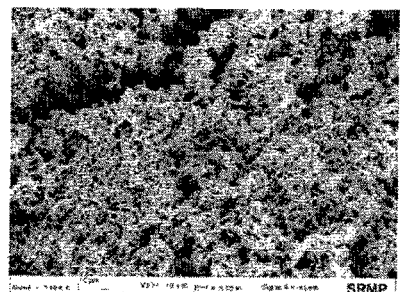
FIG. 10A corresponds to the image of the surface of a nanocomposite with 80% P3MT and FIG. 10C to the image of nanotubes of this nanocomposite coated with P3MT.
Figure 10B:
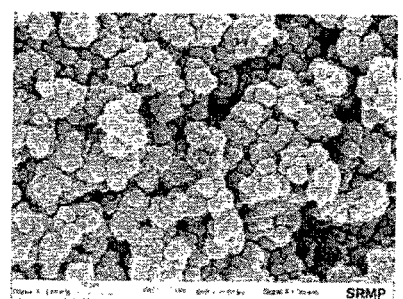
FIG. 10B corresponds to the image of the impermeable surface of a nanocomposite with more than 85% P3MT and FIG. 10D to the image of the impermeable layer as seen on the edge of this nanocomposite.
Figure 10C:
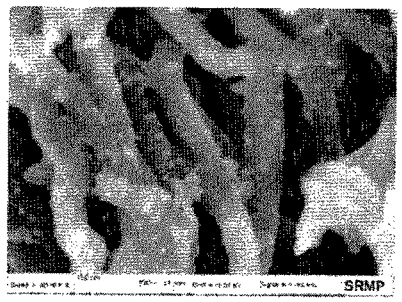
FIG. 10 gives scanning electron microscopy images of NTC/P3MT nanocomposites according to the invention.
Figure 10D:
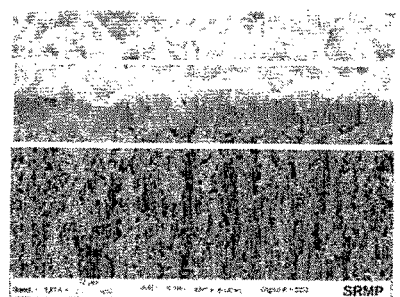

The proportion of P3MT in the nanocomposite of the invention is related to the number of applied pulses. Maximum capacitance is obtained with a sample containing between 80 and 85% P3MT (FIG. 9). This value corresponds to an optimal filling rate of the carpet of aligned nanotubes in which only little space remains between the tubes.

It is therefore assumed that at a certain time, the diffusion of the monomer in the carpet is increasingly slower. When a new pulse is resumed, it is rather more on the upper part of the carpet that polymerization occurs, obscuring the carpet. This phenomenon can account for the sudden drop in capacitance which is observed in FIG. 9.

Therefore on and above 85% of conductive polymer (P3MT) a surface layer is formed forming a shield against the solution and leading to a strong drop in capacitance. The active matter lying at depth in the mat is no longer available and loses its usefulness for storing energy.

The scanning electron microscopy images (SEM) in FIG. 10 of CNT/P3MT nanocomposites with a different number of pulses confirm this fact. In FIGS. 10A and 10C, 225 pulses were used which allowed a nanocomposite to be obtained with 80% P3MT, whereas a nanocomposite with more than 85% P3MT was obtained with 275 pulses (FIGS. 10B and 10D). Observations of the surface and edge under SEM of the nanocomposites thus obtained reveal very high filling of with CNTs coated with P3MT (FIGS. 10A and 10C) and an impermeable surface of the carpet for the nanocomposite with more than 85% P3MT (FIGS. 10B and 10D).

4.3. Effect of Rest and Pulse Time

Figure 11A:
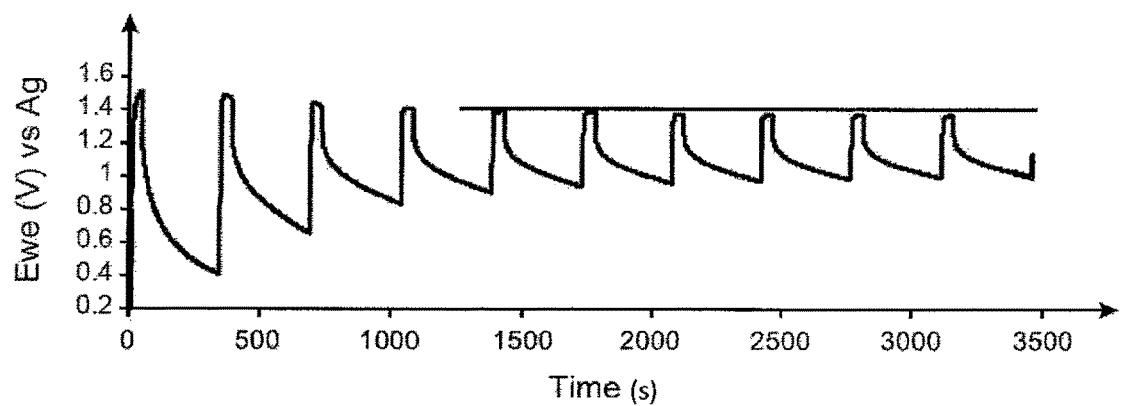
FIG. 11 illustrates pulses applied for electropolymerization with a sufficient rest time of 300 sec (FIG. 11A) or with a shorter, insufficient rest time (FIG. 11B).

Rest Time:

During electropolymerization with a sufficient rest time, the potential that is reached decreases at first and then remains near-constant throughout synthesis. This reached potential is characteristic of the oxidation potential of the polymer generated at the electrode (FIG. 11A).

Figure 11B:
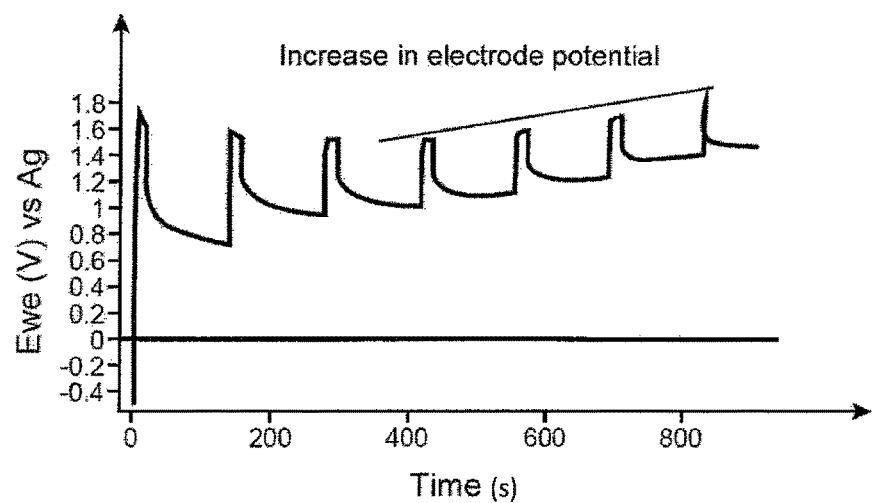

If, on the contrary, the rest time is not sufficient, diffusion will not have been sufficient to renew the quantity of monomers. The system will increase in potential to oxidize the other species in solution instead of the monomer. This characteristic increase is illustrated in FIG. 11B. It may lead to harmful effects such as over-oxidation of the polymer, adverse reactions, change in morphology . . . .

Figure 12:
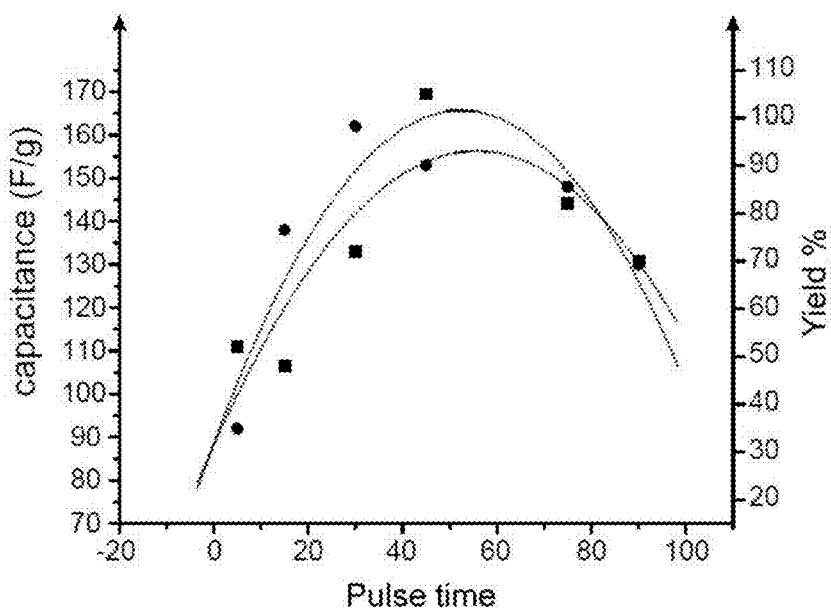
FIG. 12 shows the evolution of the capacitance (•) and the evolution of the polymerization yield (■) as a function of pulse time.

Pulse Time:

Concerning the effect of pulse time, this is illustrated in FIGS. 12 and 13.

If capacitance is determined as a function of pulse duration, bell-shaped curves are obtained both for capacitance and for polymerization yield as shown in FIG. 12.

Shorter pulse times (5-15 sec) promote the formation of MeT oligomers. Since these are partly soluble in the solvent, they diffuse in solution (since they have time to) and are therefore not counted in the polymerization yield.

The mean optimum capacitance is obtained with pulse times of about 50 sec, which roughly corresponds to the optimum polymerization yield (60 sec pulse time). Over and above this optimum, there is a drop in capacitance. Polymerization time is too long and the phenomenon of the formation of the layer on the surface of the CNT carpet is probably heightened.

Figure 13A:
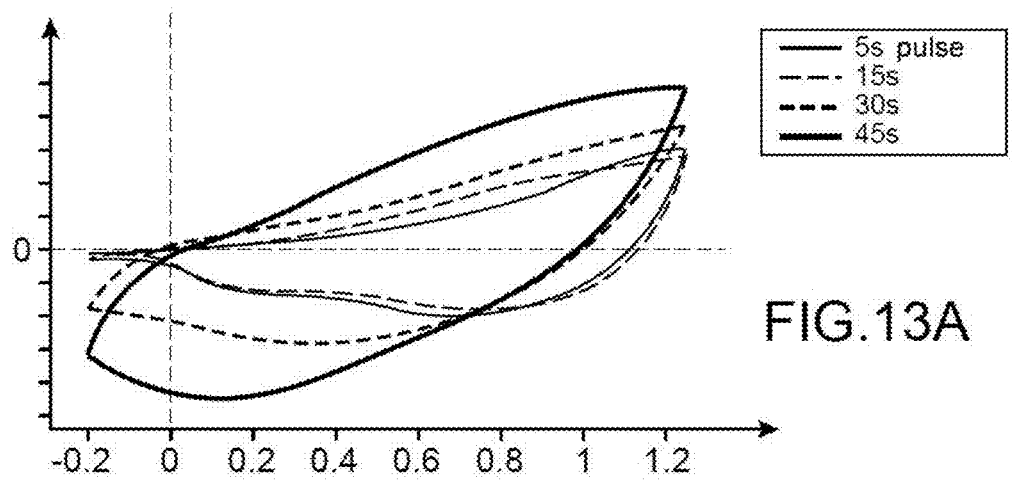
FIG. 13 illustrates characterization by cyclic voltammetry of the nanocomposites according to the invention (CNT/P3MT) for short pulse times (FIG. 13A) and for long pulse times (FIG. 13B).
Figure 13B:
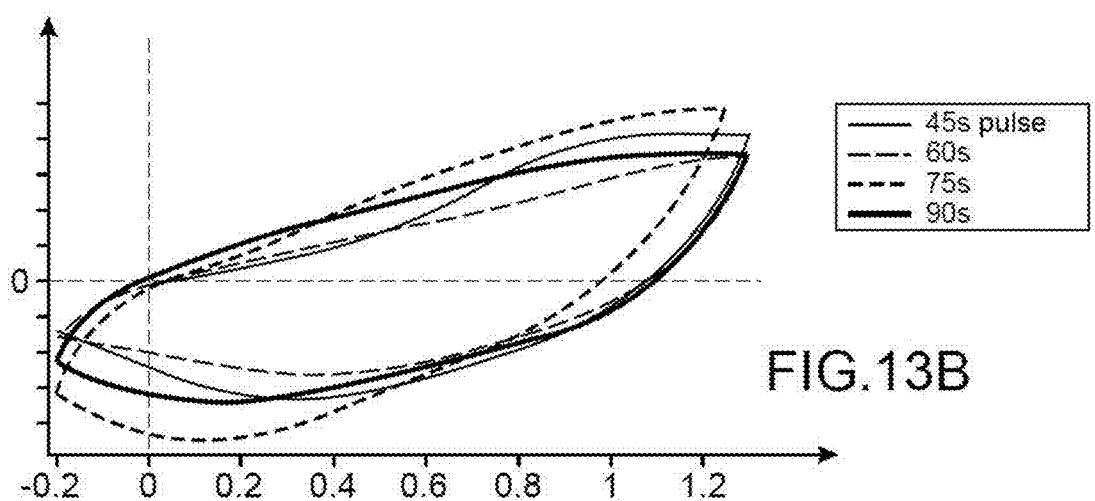

FIGS. 13A and 13B also show the variation in the charge passing through the nanocomposite during charge/discharge cycles by scanning cyclic voltammetry, and for short pulse times (i.e. of 45 sec or less) or for longer pulse times (i.e. of 45 sec or longer).

4.4. Deposit of Other Monomers

Other monomers were used to prepare a nanocomposite according to the invention from long carpets of CNTs by depositing the corresponding polymers thereupon.

These polymers were:

polyaniline (PANI) of formula:

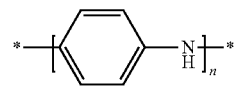

polypyrrole (PPy) of formula:

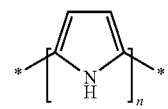

poly(3,4-ethylene dioxythiophene) (PEDOT) of formula:

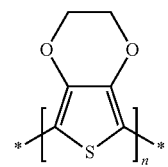

poly(3-thiophene acetic acid) (PTAA) having an acid function capable of being post-functionalised, of formula:

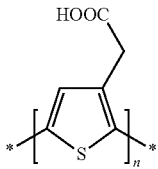

poly(carbazole) (PCz) of formula:

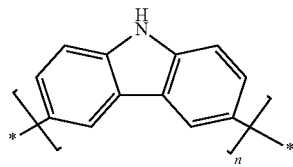

The invention claimed is:

1. A method for preparing a composite material comprising electrically conductive or semiconductive nano-objects of elongate shape and an electrically conductive polymer matrix,
    said method comprising:
    (i) providing a carpet of electrically conductive or semiconductive nano-objects of elongate shape wherein the nano-objects are aligned in a vertical array; and
    (ii) electrochemically depositing, via a solution containing monomer(s) precursor(s) of the electrically conductive polymer matrix, said electrically conductive polymer matrix on said carpet of electrically conductive or semiconductive nano-objects in pulsed galvanostatic mode, said pulsed galvanostatic mode comprising an electropolymerization technique with at least two successive applications of a constant current density for a period $t_{on}$, separated by a rest period $t_{off}$ without the application of any current or voltage,
    wherein the electrochemically depositing in the pulsed galvanostatic mode causes the electropolymerization of the matrix throughout an entire depth of the carpet without any modification of morphology of the carpet;
    wherein in the pulsed galvanostatic mode the duration of each rest period ($t_{off}$) is greater than the duration of each period of application of a constant current density ($t_{on}$) by a factor of between 2 and 5.

2. The method according to claim 1, wherein said electrically conductive or semiconductive nano-objects of elongate shape are selected from the group consisting of nanofibers, nanotubes and nanowires.

3. The method according to claim 1, wherein said electrically conductive or semiconductive nano-objects of elongate shape are in a material chosen from the group consisting of carbon, silicon, gold, silver, tantalum, nickel, platinum, copper, molybdenum, palladium, steel, stainless steel, zinc, boron nitride, zinc oxide, manganese oxide, gallium nitride, silicon nitride, tungsten disulfide, molybdenum disulfide, indium phosphide, tungsten selenide, molybdenum selenide, titanium dioxide, silicon dioxide, molybdenum trioxide, and mixtures thereof.

4. The method according to claim 1, wherein said electrically conductive polymer matrix is formed of one (or more) (co)polymers selected from the group consisting of the polyfluorenes, polypyrenes, polyazulenes, polynaphtalenes, polypyrroles, polycarbazoles, polyindoles, polyazepines, polyanilines, polythiophenes, poly(p-phenylene sulfides), polyacetylenes and poly(p-phenylene vinylenes).

5. The method according to claim 1, wherein, in the pulsed galvanostatic mode, a constant current density is applied for periods ($t_{on}$) of duration between 10 and 100 s.

6. The method according to claim 1, wherein in the pulsed galvanostatic mode the duration of each rest period ($t_{off}$) is greater than the duration of each period of application of a constant current density ($t_{on}$) by a factor of 2.

7. The method according to claim 1, wherein step (ii) comprises:
    a) contacting the electrically conductive or semiconductive nano-objects of elongate shape with the solution (hereinafter designated solution (S)) containing the monomer(s) precursor(s) of said electrically conductive polymer matrix;
    b) polarising said nano-objects in pulsed galvanostatic mode, after which said electrically conductive polymer matrix is electrochemically deposited on said nano-objects.

8. The method according to claim 7, wherein prior to said step (a), the electrically conductive or semiconductive nano-objects of elongate shape are subjected to an oxidizing treatment (or pre-treatment).

9. The method according to claim 7, wherein said solution (S) is in the form of a pure, protic or aprotic solvent; in the form of an electrolytic solution containing, as solvent, a protic solvent or an aprotic solvent; or in the form of an ionic liquid.

10. The method according to claim 1, wherein, in the pulsed galvanostatic mode, a constant current density is applied for periods ($t_{on}$) of duration between 20 and 80 s.

11. The method according to claim 1, wherein, in the pulsed galvanostatic mode, a constant current density is applied for periods ($t_{on}$) of duration between 30 and 60 s.

12. The method according to claim 1, wherein in the pulsed galvanostatic mode the duration of each rest period ($t_{off}$) is greater than the duration of each period of application of a constant current density ($t_{on}$) by a factor of 5.

13. The method according to claim 8, wherein said solution (S) is in the form of a pure, protic or aprotic solvent; in the form of an electrolytic solution containing, as solvent, a protic solvent or an aprotic solvent; or in the form of an ionic liquid.

14. The method of claim 1, wherein step (ii) comprises impregnating the carpet of electrically conductive or semiconductive nano-objects with the electrically conductive polymer matrix.

15. The method of claim 1, wherein step (ii) is performed in an inert atmosphere.

16. The method of claim 1, wherein the composite material obtained is a self-supported material.

17. A method for preparing a composite material comprising electrically conductive or semiconductive nano-objects of elongate shape and an electrically conductive polymer matrix,
    said method comprising:
    (i) providing a carpet of electrically conductive or semiconductive nano-objects of elongate shape wherein the nano-objects are aligned in a vertical array; and
    (ii) electrochemically depositing, via a solution in the form of an ionic liquid containing monomer(s) precursor(s) of the electrically conductive polymer matrix, said electrically conductive polymer matrix on said carpet of electrically conductive or semiconductive nanoobjects in pulsed galvanostatic mode, said pulsed galvanostatic mode comprising an electropolymerization technique with at least two successive applications of a constant current density for a period $t_{on}$, separated by a rest period $t_{off}$ without the application of any current or voltage, wherein the electrochemically depositing in the pulsed galvanostatic mode causes the electropolymerization of the matrix throughout an entire depth of the carpet without any modification of morphology of the carpet wherein in the pulsed galvanostatic mode the duration of each rest period ($t_{off}$) is greater than the duration of each period of application of a constant current density ($t_{on}$) by a factor of between 2 and 5.

* * * * *